July 14, 1964
C. R. JOHNSTON
3,140,911
ELEVATIONAL PROFILE TRANSCRIBING APPARATUS
FROM TERRESTRIAL LAND MAPS OR THE LIKE
Filed May 23, 1960
3 Sheets-Sheet 1
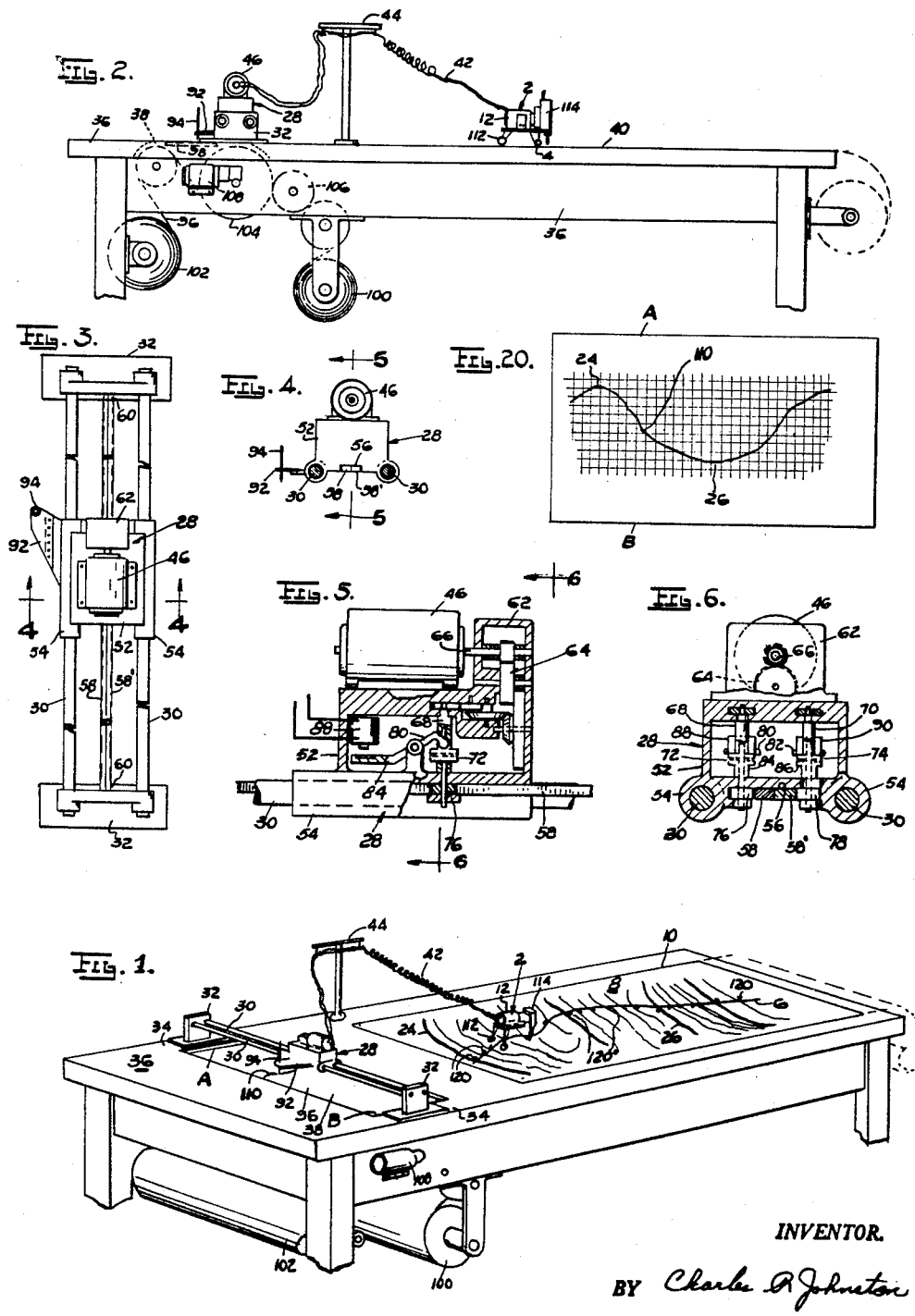
INVENTOR.
BY Charles R Johnston July 14, 1964
C. R. JOHNSTON
3,140,911
ELEVATIONAL PROFILE TRANSCRIBING APPARATUS
FROM TERRESTRIAL LAND MAPS OR THE LIKE
Filed May 23, 1960
3 Sheets-Sheet 2
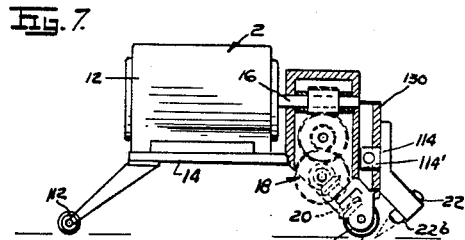
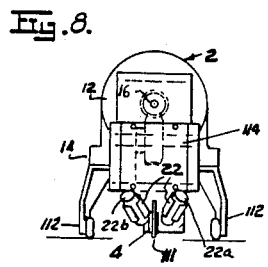
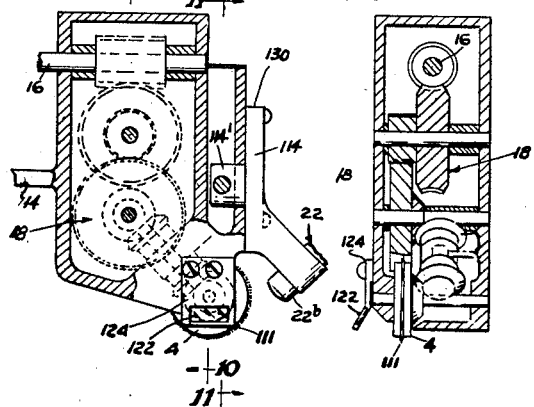
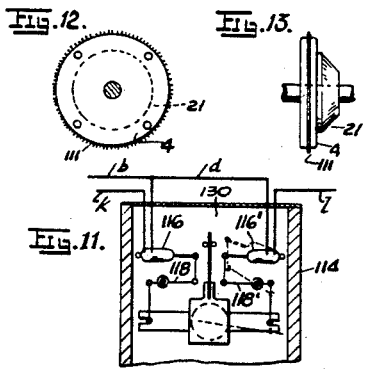
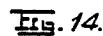
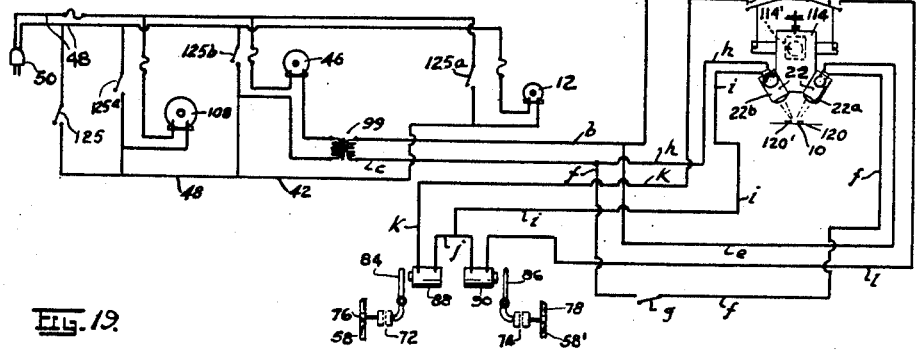
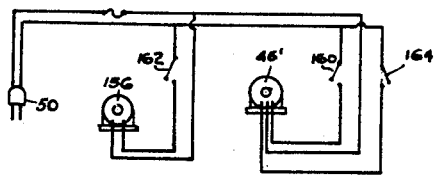
INVENTOR.
BY Charles R. Johnston July 14, 1964 C. R. JOHNSTON 3,140,911
ELEVATIONAL PROFILE TRANSCRIBING APPARATUS
FROM TERRESTRIAL LAND MAPS OR THE LIKE
Filed May 23, 1960 3 Sheets-Sheet 3
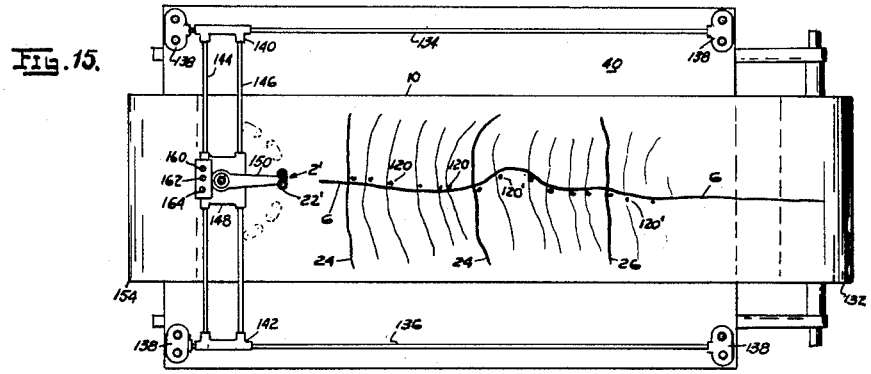
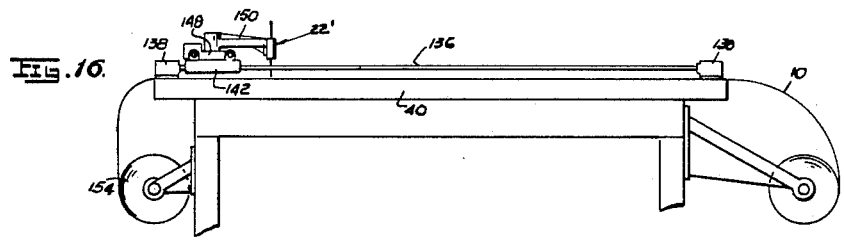
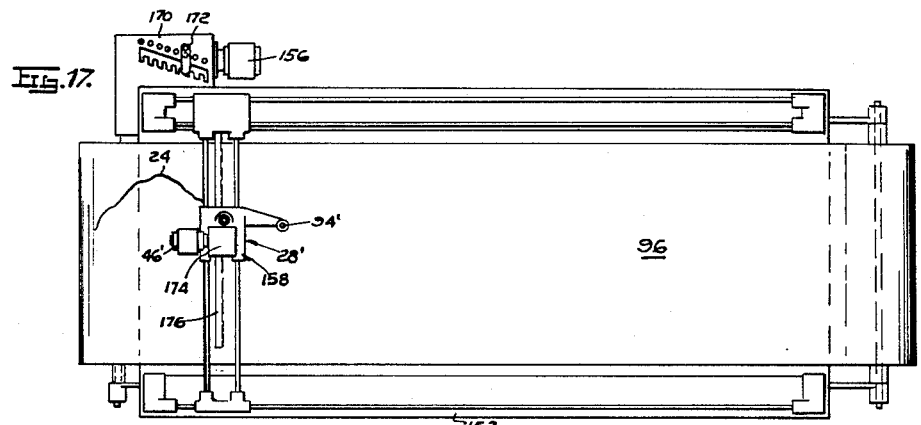
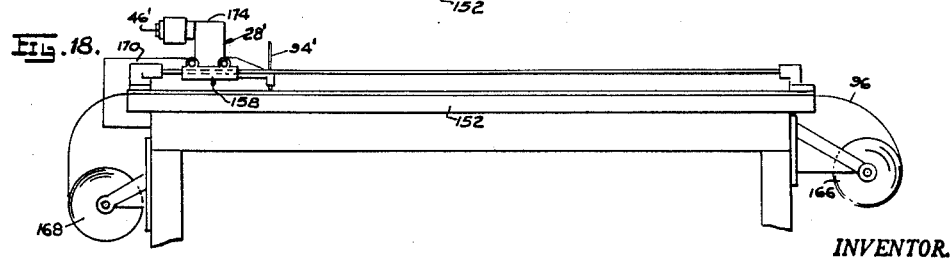
INVENTOR.
BY Charles R. Johnston

| United States Patent Office | 3,140,911
--- | ---
 | Patented July 14, 1964

3,140,911
ELEVATIONAL PROFILE TRANSCRIBING APPARATUS FROM TERRESTRIAL LAND MAPS OR THE LIKE
Charles R. Johnston, 748 Beech Ave., Chula Vista, Calif., assignor of one-tenth to A. F. Graf von Saden, San Diego, Calif.
Filed May 23, 1960, Ser. No. 30,908
1 Claim. (Cl. 346—31)

This invention relates to land map terrain transmitting apparatus, and more particularly to instruments adapted for automatically and continuously transcribing profile lines of a given section or part of horizontal plane secured from the terrestrial land maps.

Manifestly, an object of the invention is to provide means for transmitting or transcribing any longitudinal and irregular portion between points or a line which is scribed over a terrestrial land or surveyor's plot or map, and for transcribing same from said contour map into a sectional profile line which is the identical scale or in a suitable proportional ratio thereof.

Accordingly, an object of the invention is to provide means for following a designated line which is delineated over a proposed terrestrial terrain, having an indicated rise or surface drop as depicted upon a land map, also, said invention having means for automatically transcribing said terrestrial terrain in form of a vertically sectional rise or elevation, including the drop or declination of said terrain, and thereby securing a sectionally elevational or transversely sectional profile graph depicting same in a geometrical projection having the absolute height and the lowest depression of the ground as indicated by the designated line on the map or chart.

A further object of the invention is to provide said apparatus with means for transmitting a line of any configuration from the terrestrial terrain of a map or chart upon a plotting paper of suitable or required cross-section, said transcribing of a directional line to be made in form of a geometrically sectional elevation, so that the various ground elevations and depression of the ground from a flat map into a profile line may be secured accurately and in a short period of time.

Another object of the invention is to provide said apparatus with means for securing a geometrically sectional elevation of a plotted terrestrial terrain upon a continuous roll of a graph paper, which may be in an enlarged scale proportional to the original terrestrial terrain as indicated by delineation of direction on the map or chart, from which said vertically sectional values are to be determined.

A further object of the invention is to provide said apparatus with means for automatically registering the locus lines which are to be determined, for securing a rapid check or re-check when changes in the directional line on said map or chart are made, contemplated or directed and from which said vertically sectional values are taken.

Another object of the invention is to provide said apparatus with a self-propelled and movable electromechanical tracer means, said tracer means to be guided over a directional line provided on the terrestrial map from which said vertically sectional and geometrical values are to be determined, said tracer means having an electromechanical contact means associated therewith and connecting an electro-mechanical scriber means for automatically registering and for transcribing the positional values from said movable tracer means and upon or unto a suitable graph paper positioned directly and under the scriber member, and thereby providing a visual and to scale a vertically sectional profile line and elevational value from the top plan views of a terrestrial terrain provided on a land map, chart or the like.

The invention also has for its objects to provide such means that are positive in operation, convenient in use, easily installed in a working position and easily disconnected therefrom, economical in manufacture, relatively simple, and of general superiority and serviceability.

Other and further objects and advantages of the invention as will hereinafter more fully appear, are attained by the construction herein shown on the drawings and described in the specification, forming a part of the application.

Reference is now had to the accompanying drawings, in which the similar reference characters denote the same parts.

In the drawings:

FIG. 1 shows a perspective view of the apparatus which is the invention, for automatically transcribing a delineated longitudinal mark or line on a terrestrial terrain map or chart into a vertically sectional profile trace or elevational profile line.

FIG. 2 shows the front elevational view of the apparatus.

FIG. 3 shows a fragmentary and slightly enlarged top plan view of the transcribing unit of the apparatus.

FIG. 4 shows a partly sectional and partly elevational view of the transcribing driving unit, taken on line 4—4 of FIG. 3.

FIG. 5 shows an enlarged sectional and partly elevational view of the driving unit, taken on line 5—5 of FIG. 4.

FIG. 6 shows a fragmentary sectional and partly elevational view of said driving unit, taken on line 6—6 of FIG. 5.

FIG. 7 shows a side elevational and partly sectional view of the tracer apparatus.

FIG. 8 shows the front elevational view thereof.

FIG. 9 is the enlarged vertically sectional view of the driving member of said tracer apparatus.

FIG. 10 is the vertically sectional view thereof, taken on lines 10—10 of FIG. 9.

FIG. 11 is another vertically sectional view and partly fragmentary view of said tracer apparatus, taken on line 11—11 of FIG. 9.

FIG. 12 shows a side elevational view of the driver member.

FIG. 13 is the front elevational view thereof.

FIG. 14 shows a diagrammatical view of the wiring system which is used in said apparatus as described in FIG. 1.

FIG. 15 shows a top plan view of the tracer apparatus, showing same in a modified form.

FIG. 16 is the side elevational view thereof.

FIG. 17 shows the top plan view of the transcriber apparatus showing same in a modified form.

FIG. 18 shows the side elevational view thereof.

FIG. 19 is the electrical system wiring diagram of the apparatus shown in FIGS. 15 and 17.

FIG. 20 shows a top plan view of the graph disclosing the vertically elevational profile of the terrain when transcribed from a terrestrial terrain, map or chart, shown on the left of FIG. 1.

Describing the invention more in detail, in its broader aspects, said invention comprises a tracer member generally designated by numeral 2, consisting of a self propelling device actuated by a rotary indicator 4 and adapted for following an indicating line 6 drawn over a terrestrial terrain 8 upon a surveyor's map or chart 10, designating a measured region or a tract of land, or, which may be an indicated or proposed pipe line, trench, canal, highway or the like.

Said tracer member 2 is provided with a motor 12 mounted upon a base 14 and having a shaft 16 engaging a set of reduction gears 18, the lower section of which terminates with a suitable driver wheel combination 21 to which said rotary indicator 4 is connected, as shown.

The front section of said tracer member 2 is provided with a pair of suitable light ray activator members or scanners 22 which are angularly arranged and adapted for automatically activating the electrical component parts of the apparatus and whenever the elevation 24 or the depression 26 of the terrain on the map is reached and as marked accordingly in heavy contour lines upon said map or chart 10.

The companion part of said apparatus consists of a scriber member 28, which is slidably mounted upon a pair of guiding rods 30 provided with a pair of end supports 32 which are mounted at the opposite edge sections 34 of a table 36, said table having an opening section 38 which is disposed beneath said transcriber member 28 as shown.

Said table 36 extends endwardly from said opening section 38, thus providing a table flat top 40 upon which said map or chart 10 is secured and over which said tracer member 2 is guided, in the manner as shown in FIG. 1.

The motor 12 of said tracer member 2 is provided with a set of electrical lead wires 42, which are supported uopn a cross bar member 44 mounted on said table 36 as shown, and the extended ends of said lead wires are connecting a motor 46 of said transcriber member 28. Said motor 46 is also provided with wire extensions 48 terminating with a suitable electrical connecting plug member 50 which connects with the electrical outlet (not shown) and from which the electrical current of 110 volts is tapped.

Said motor 46 of said transcriber member 28 is mounted upon a sliding block or runner 52 having a pair of bearing extensions 54 for accommodating said guiding rods 30, and also having a suitable centrally positioned slot 56 for mounting therein a pair of gear rack members 58 and 58' which are positioned therein back to back, as shown, of which the end sections 60 being suitably secured in said end supports 32 and thus providing a rigid structure for said sliding block 52.

As shown in FIGS. 5 and 6, said sliding block 52 is arranged for supporting said motor 46, also, having a gear case or housing 62 wherein a set of reduction gears 64 are mounted and connected to a motor shaft 66 disposed at the upper section of said housing, said reduction gears 64 at the lower gear drive section are provided with a pair of vertically mounted drive shafts 68 and 70, each shaft being provided with a suitable clutch 72 and 74 respectively, and each shaft having the respective pinion gear 76 and 78 mounted thereon, as shown, said pinion gears being held in mesh with the respective gear rack members 58 and 58'.

Each cutter member 72 and 74 is provided with a yoke 80 and 82 respectively, each of which having a pivoted extension bar 84 and 86 mounted in close proximity to and below the respective magnetic solenoids 88 and 90.

Said reduction gears 64 revolving by said motor 46 are also turning said vertical shaft drives 68 and 70 which are turning in an opposite direction, so that when one of said clutch members 72 or 74 is depressed or forced into engaging position by energizing the particular magnetic solenoid 88 or 90 and thereby activating the respective yoke 80 or 82, then correspondingly said pinion gears 76 or 78 will engage the respective gear rack members 58 or 58', and thereby causing said sliding block or runner 52 to move and slide upon said pair of guiding rods 30 into an upper or the lower positions.

Said sliding block 52 of said transcriber member 28 is provided with a sidewardly extending bracket 92 wherein a suitable scriber member 94 is mounted and held in a vertical position, as shown, said scriber member being a ball point or a self inking type writing unit, so that any required and continuous markings upon the surface of the graph paper 96 may be secured.

Said opening 38 in said table 36 is provided with a vertically adjustable plate member 98, which is for the purpose of holding said graph paper 96 in position and entirely flat under said scriber member 94 while said paper is guided from a roller 100 and then upon a winding roller 102.

The graph paper 96 is arranged to pass from said roller 100 and then over a driving roller 104 having a herringbone pressure roller 106 disposed in close proximity thereto for pressing said paper and for preventing said paper from creeping, and if so desired, said winding roller 102 may be driven by means of a suitable expansion belt or the like for keeping said paper taut and firm.

When in operation, said driving roller 104 is driven at a suitable linear speed that is arranged for feeding and guiding said graph paper 96 over said adjustable plate 98 and for holding same at a firm surface tension.

To that end said driving roller 104 is provided with a suitable driving apparatus or motor 108, the speed of which being suitably regulated so that the required linear peripheral speed of said roller may be in conformity with the required scale or graph paper on which the profile of various land or ground elevations and depressions are transcribed when the apparatus is in use and operation.

Said transcriber member 28 is an automatic follower of said tracer member 2, for the purpose of transcribing a vertically elevational profile of the ground as defined in contour lines upon the land map or chart and at the precise section as indicated by the indicating line 6 over which said tracer member 2 is guided.

In order to secure said transcribed vertical elevations and depressions from said map contour lines as indicated by said indicating line 6 and defined on said map or chart 10, said map or chart is first prepared by making thereon said directional indication line 6 designating a proposed route over the ground or terrain and from which said vertically elevational profile 110 is desired to be transcribed upon said graph paper 96, as shown in FIG. 20, and whereon the elevational cross-section of the terrain is shown in a completed form.

Said tracer member 2 is activated and made mobile by means of said motor 12, of which the motor shaft connects said reduction gears 18 and through said gears having in mesh the downwardly extending rotary indicator 4 which is turned and propelled by the action of said motor 12 and manually guided into position to ride directly over said indicating line 6 at an approximate linear speed of at least two linear feet per minute, or any other speed ratio that may be found to be practical and advantageous in practice.

The peripheral section of said indicator 4 is provided with suitable serrations or a plurality of outwardly extending projections 111, so that a sufficient hold and traction may be had over the paper surface and which is also intensified by the weight of said tracer member 2, while at the rear section thereof a pair of suitably spread supporting members are provided with rollers 112 which are extending angularly and sidewardly from said base section 14, so that a balance of said tracer member 2 may be maintained when manually guided over said indicating line 6.

Said map or chart 10 is suitably prepared and processed by first drawing said directional indicating line 6 thereon and then marking the up-grade and down-grade contour locus lines which may cross or come in close proximity to said indicating line 6, said markings which indicate the up-grade contour locus lines or elevations 24 being marked on the left side of said indicating line 6, and the down-grade contour locus lines or depressions 26 being marked on the right side of said indicating line 6, each marking so made being in close proximity to said line 6, as hereinbefore mentioned. Said markings being for the purpose of indicating the major contour locus line intervals generally indicated in heavy lines on the map in five feet, ten or twenty feet or greater distances and the intermediate contour interval line indicating shorter distances therebetween, which may be two feet or the like, the purpose of which will be presently described.

Said pair of light ray activator members or scanners 22 are pivotally mounted upon the front section of the housing extending from said motor base 14 (see FIGS. 7 and 8) having an enclosure 114 mounted upon a pivot 114' and wherein a set of electrical mercury switches 116 and 116' are also pivotally mounted, each having suitable compound linkage members 118 and 118', so that the electrical contact position of said switches or the release and breaking of said electrical contact position of said switches 116 and 116' may be assured.

Said markings upon the sides of said indicating line 6 designating said locus lines of elevations 24 and depressions 26 of the terrain including said intermediate contour lines therebetween are made in form of short heavy lines or dots 120 and 120' respectively, each line or dot having a surface with a light reflecting quality, which may be had when using elements such as aluminum paint, the tin foil material or the like, so that said light ray activator members or scanners 22 may be allowed to function properly.

When said map or chart 10 in its processed form is secured upon said table 40, as shown in FIG. 1, said tracer member 2 is placed thereover, having said rotary indicator 4 directed over said indicating line 6.

Said rotary indicator 4 when placed in operation, pulls the entire tracer member 2 structure, and is directed to pass and follow over said indicating line 6, and same is manually re-directed when sidewardly deflected from a straight or curved line or turned abruptly at an angle. For securing a visional accuracy in manually directing said tracer member 2 over said line 6 a suitable magnifying member 122 is provided, which is mounted in a bracket member 124 and attached to the gear housing and extending in close proximity to said rotary indicator 4, so that said indicating line 6 may be observed at all times and the tracing position of said tracer member 2 may be directed accordingly.

Said graph paper 96 is then threaded between said rollers 104 and 106 and over said adjustable plate 98 for allowing said scriber member 94 to rest upon the paper surface. When tracer member 2 is placed in position upon said map having said rotary indicator 4 directly on said indicating line 6, and also, when said scriber 94 of said transcriber member 28 is in position upon the surface of said graph paper 96, then the common operating switch 125 is closed, thus activating simultaneously said motor 12 of said tracer member 2 and said motor 46 of said transcriber member 28, including said driving motor 108 of said driving roller 104, said motors operating in unison at a required speed ratio purpose of securing the desired result. It may also be noted, that said tracer motor 12, including the transcriber motor 46 and said paper roll driving motor 108 may be independently activated, by providing in the wiring system suitable independent switches 125ᵃ, 125ᵇ, and 125ᶜ respectively, so that each motor may be operable independently of the other and when the apparatus is in operation.

Further, the starting position of said transcriber member 28 over said graph paper 96 is first gaged by the approximate terrain on said map 10 which is to be transcribed, and that is, when it is concluded that said major contour interval or elevational line 24 is the starting point which indicates that the next elevational line is lower or reaching the depression contour interval line 26, then said scriber 94 is placed nearly at the top A of said graph paper 96, and, when said starting point indicates the lowermost interval line 26 progressing upwardly and indicating an upward slope, then said scriber 94 is placed nearly at the bottom B of said graph paper 96, so that an uninterrupted progression of terrain contour may be transcribed when the apparatus is in operation.

Also, said reduction gears 64 are in motion only when either of said clutches 72 or 74 are engaged and become actuated by said magnetic solenoids 88 or 90 and when either of said mercury switches 116 or 116' makes a contact and the electrical current becomes closed, which causes the respective extension bars 84 or 86 to be depressed and thereby causing the respective gear pinions 76 or 78 to engage said gear rack members 58 or 58', and in consequence thereof causing said sliding block 52 to move into an upward or a downward direction.

In this manner, each intermittent movement and stop of said sliding block 52 which includes the position of said scriber 94 directed upon the surface of said graph paper 96, will represent the exact intermediate interval of contour of the elevation or depression disposed between said major contour intervals on said map.

Said light ray activators or scanners 22 comprise two separate unit members, one of which is provided with a suitable glow lamp that may be energized by a conventional electric light current and the other unit having a suitable selenium plate for closing the electrical current when energized by a beam of light directed upon said selenium plate, each scanner having an objective element for concentrating the light rays emitting from and directed upon the other scanner and within a short distance from said objective elements, and each concentrated beam of light rays are arranged in focus upon a common point or apex.

Normally, said housing 114 of said tracer member 2 is in its central and inactive position, said pair of scanners 22 being focused directly at the center and slightly in front of said serrations 111 of said indicator wheel 4 and directed upon said indicating line 6 of said map or chart 10.

Therefore, when said rotary indicator 4 reaches one of said major contour intervals, indicating a locus line of elevation 24 and the following subsequent elevations are lower, and each of said major and subsequent interval lines having reflecting lines or dots 120 disposed thereon at the left side of the indicating line 6, then the upper section 130 of said housing 114 is manually tilted to the right, causing said mercury switch 116 to close the electrical circuit and also causing said pair of light ray activators or scanners 22 to focus the light rays on said reflecting line or dot 120, the reflection of said light rays causing the electrical current flow to be closed. In tilting said linkage members 118' and pivoting said mercury switch 116' the electrical contact becomes closed and thereby allowing said left magnetic solenoid 90 to become energized which also causes the extension bar 86 to engage said clutch 74.

The engagement of said clutch 74 causes the gear pinion 78 held in mesh with the gear rack 58' to move and drive said sliding block 52 in a downward direction and toward the bottom of the paper section B, causing said scriber 94 to mark a downward and slightly angular line 110 upon said graph paper surface 96 transversely passing thereunder.

During the operation of the apparatus said sliding block 52 will not move in any direction, either up or down, until the next light reflecting bar or dot 120 or 120' is reached by the focused beam of light rays emitting from said light ray activators or scanners 22, which causes the electrical current to be closed. And only when said upper housing 114 is tilted in the direction desired for allowing said light rays to be concentrated directly upon the reflecting surface of said bar or dot 120 and 120' disposed thereunder, said reflected light rays will again energize the photoelectric cell of said scanner 22 and allowing the electric current to pass through the respective mercury switches 116 or 116' including the respective magnetic solenoids 88 or 90, thus again energizing said motor 46 and rotating the respective reduction gears connected thereto which will move and drive said sliding block 52 including said scriber 94 in the manner and direction desired.

As shown in the wiring diagram in FIG. 14, a pair of scanners are mounted at the lower edge of the pivot housing 114, which comprise a glow lamp scanner 22$^a$ for providing the light source and a scanner photoelectric cell 22$^b$ for receiving the light ray signal and for closing the circuit, said housing 114 being provided with said pivoting mercury switches 116 and 116', of which said switch 116 connects with the solenoid 88 and the switch 116' connects with the solenoid 90.

The wiring connection of said scanners 22$^a$ and 22$^b$, including said mercury switches 116 and 116' and the respective solenoids 88 and 90 is accomplished by means of the electric source of current passing into and through a transformer 99 allowing the electrical current to pass into current carrying lines $b$ and $c$, said transformer line $b$ extending to and connecting with a common line connection $d$ for connecting said mercury switches 116 and 116' respectively.

Said lead line $b$ is provided with a connecting lead wire $e$ which connects one side of the glow lamp 22$^a$ for providing the source of light and completing the circuit by securing the wire lead line $f$ to the transformer lead wire $c$, said wire lead line $f$ is provided with a switch $g$ for controlling the electrical current passage into said glow lamp 22$^a$.

The transformer lead line $c$ is provided with a line connection wire $h$ which leads to and connects the anode of said photoelectric cell 22$^b$, and having the cathode of said photoelectric cell provided with a lead line $i$ which leads to and connects with the common connecting line $j$ of the solenoids 88 and 90.

Said solenoid 88 is provided with a companion line connection $k$ for connecting said mercury switch 116, while the solenoid 90 is provided with a companion line $l$ for connecting said second mercury switch 116' of the apparatus.

In operation when said housing 114 is tilted in a clockwise direction, and the switch $g$ is closed, then the concentrated light rays of the glow lamp 22$^a$ will be directed upon the surface of the line or dot 120' on the map, which will also tilt and will close the mercury switch 116', thus causing the electrical current to pass through the line $b$ and $d$ from said transformer $a$ and also allowing the current to pass through the lead line $l$ and energizing the solenoid 90.

When said housing 114 is tilted and the light rays of said glow lamp 22$^a$ are reflected into said photoelectric cell 22$^b$ then the electric current is allowed to pass through the lead line $h$ from said transformer line $c$, causing the electric current to pass through the lead line $i$ and into said common line connection $j$ for energizing said solenoid connected thereto.

Also, when said housing 114 is tilted in an opposite direction, for causing said concentrated light rays to be directed upon the line or dot 120 and thereby causing said rays to be reflected upon the photoelectric cell 22$^b$, then the mercury switch 116 is tilted and causes the electric current to pass from said transformer line $b$ and flowing to the common line $d$ and then through the line $k$ for energizing the solenoid 88.

Said photoelectric cell 22$^b$ is employed as an electric current control valve for allowing said electrical current to pass into and through the common line $j$ for making contact and energizing said solenoids 88 and 90, and only when the concentrated light rays are directed upon and reflected from said lines or dots 120 or 120', which causes the respective clutches 72 or 74 to become engaged and thus causing the respective gears and racks 76 and 58 or 78 and 58' to become activated and to drive said transcriber 28 in the direction desired, which may be upwardly for depicting the rise of the terrain or downwardly for indicating the depression of the terrain contour.

In this manner and while said tracer member 2 is manually guided over the map surface and directed over said indicating line 6, and while said sliding block or runner 52 including said scriber 94 moves into the A or B direction, a transcription of a vertically elevational profile line of the terrain contour may be secured, thereby saving considerable time and providing a record in form of a very accurate transcription of the indicated contour terrain, also, eliminating the tedious and in many instances inaccurate drafting of elevational section often produced having erroneous chart line which must be corrected therefore time consumming.

In the modification of the apparatus, as shown in FIGS. 15 and 17, the map or chart 10 is fed upon the table flat top 40 from a suitable table roll 132 covering long distances and which is suitably processed as hereinbefore provided.

Any portion of the terrain depicted on said map or land chart 10, from which a vertically elevational profile line is desired to be transcribed, that particular portion of said map is secured in place and over which said tracer member 2' is directed.

Said tracer member 2' is directed manually over the entire length of said table, being slidably mounted upon a pair of horizontally positioned carriers or rods 134 and 136, each of which being mounted and secured in position upon suitable brackets 138, said rods being slidably disposed within a pair of headers 140 and 142 respectively.

Said headers 140 and 142 are provided with a pair of cross rods 144 and 146 for supporting a bridge member 148 which is slidably mounted thereon. Said bridge member 148 is provided with a pivotally mounted tracer arm member 150, the end section of which having a pivotally adjustable bracket on which said pair of the light ray activators or scanners 22 are secured.

The map or chart 10 is first prepared in the similar manner as previously described, so that when said tracer member 2' is moved manually over the terrain and following said indicating line 6, then said activators or scanners 22 may be used by directing the focused light rays upon the reflecting bars or dots 120 or 120' by tilting same in the direction desired, and thereby securing a transcribed elevational and depressed profile line upon the surface of the graph paper 96 which is disposed on said transcribing table 152, shown in FIG. 17.

When the transcribing operation is complete of the entire length of said map 10 on table 40, said map section may be rolled upon the end roll 154 and the newly exposed map surface section may be further transcribed for securing the subsequent elevational profile line and in the same manner as hereinbefore described.

Said sliding bridge member 148 on said table 40 is connected with said transcribing table 152 by means of suitable electrical wires, as shown in the wiring diagram illustrated in FIG. 19, and in order to activate said motor 46' of said transcriber member 28' including the driving motor 156 for moving said transcriber member 158 in a lengthwise direction over said table, said bridge member 148 is provided with a plurality of push button switches 160, 162 and 164, the operation of which will be presently described.

For securing the elevational profile line from said map 10, the surface section of said table 152 is provided with a suitable graph paper 96 which is fed thereon from a roll 166 and to the front roll member 168, as shown in FIGS. 17 and 18.

Said graph paper 96 is secured in place and position during the operation of the apparatus, so that a flat and firm paper surface may be had for said scriber 94 to draw and transcribe the line thereon.

Said driving motor 156 is attached to a change speed gearing apparatus 170, so that when changing the position of a change gear lever 172 disposed therein, a variable horizontal motion of said transcriber member structure 158 may be had. Said change speed gearing apparatus 170 may be arranged so that any desired scale of a graph paper may be used for securing a scale drawing of elevational profile lines from said terrain when taken from said flat map or chart 10.

The positions of said push-buttons 160 and 164 indicate the directions in which said transcriber structure 158 moves, which is by depressing push button 160 said transcriber moves into an upward direction, and when depressing said push button 164 a downward direction of the apparatus is secured.

Said motor 46' is provided with suitable speed reduction gears disposed in a gear housing member 174, so that when either of said push-buttons 160 or 164 is depressed for making an electrical contact, said motor 46' and the respective gears engaging the gear pinion and the gear rack 176 will cause said transcriber structure 158 to move into an upward or the downward direction, then the motor will stop at a predetermined distance and will not move in either direction until said push-buttons are pressed and re-activated for securing a repeat movement thereof.

Said mercury contact switches 116 and 116' associated with said light ray activators or scanners 22 provides a safety in the operation of the apparatus, since the push-buttons 160 and 164 can not completely close the electrical circuit without the contact being first made through said respective switches 116 or 116' and which may be accomplished only by tilting said housing 114 to one side or the other in the manner hereinbefore described, while said push-button 162 is used for energizing said driving motor 156 and which is for driving said transcriber member structure 158 forwardly over said table 152.

It may be noted, that said push-button 162 may be substituted for a double action switch for causing said driving motor 156 to be reversed, and thereby allowing said transcriber member structure to move in either direction over said table 152.

In the manner herein described, a very accurate transcription of the terrestrial terrain from a land map or chart 10 may be had in form depicting a sectionally vertical profile line, showing the precise elevations and depressions of the ground and to a required scale, as in practice may be found to be desirable and advantageous.

Accordingly, it is not proposed that the invention be limited to the exact details of construction herein shown on the drawings and described in the specification, and that the necessary changes and modification may be made therein, which may come within the scope of the appended claim.

I claim as my invention:

In the apparatus of the class described for transcribing the elevational profile line from a flat map, the combination of, a table having a terrestrial terrain flat map mounted thereon, said map having a direction indicating line outlined over said terrain and a plurality of light reflecting dots at each side of said indicating line for designating the progressive rise and depression of the ground, a tracer means disposed upon the surface of said map having driving means for propelling same thereover, a rotary indicator connecting said last mentioned means for following said direction indicating line, a tiltable light ray indicator connecting said tracer means for tilting and focusing the light rays upon said light reflecting dots, a transcriber means in said apparatus, means in said tiltable light ray indicator for simultaneously activating the transcriber means, said transcriber means comprising, a movable sliding runner, a scriber in said sliding runner, means disposed beneath said scriber and said sliding runner for continually moving a graph paper thereunder, electric wiring in said transcriber means connecting said tracer means for activating said transcriber and thereby transcribing an elevational profile line upon said graph paper when said tracer means is moved over said indicating line depicted on said map and during the continuous operation of said apparatus.

References Cited in the file of this patent

UNITED STATES PATENTS

| | | |
|---|---|---|
| 2,965,432 | Alfaya | Dec. 20, 1960 |
| 2,982,940 | Fryklund | May 2, 1961 |